United States Patent
Mills (10) Patent No.: US 10,540,742 B2
(45) Date of Patent: Jan. 21, 2020

(54) IMAGE WARPING IN AN IMAGE PROCESSOR

(71) Applicant: Apple Inc., Cupertino, CA (US)

(72) Inventor: Christopher L. Mills, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 27 days.

(21) Appl. No.: 15/499,459

(22) Filed: Apr. 27, 2017

(65) Prior Publication Data

US 2018/0315170 A1 Nov. 1, 2018

(51) Int. Cl.
*G06T 3/00* (2006.01)

(52) U.S. Cl.
CPC .................... *G06T 3/0093* (2013.01)

(58) Field of Classification Search
CPC .. G06T 15/04; G06K 9/00973; G06K 9/6202; G09G 5/03
See application file for complete search history.

(56) References Cited

U.S. PATENT DOCUMENTS

| | | | |
|---|---|---|---|
| 6,614,442 B1 * | 9/2003 | Ouyang | H04N 19/51 345/545 |
| 8,660,383 B1 | 2/2014 | Callari et al. | |
| 9,251,169 B2 | 2/2016 | Smith | |
| 2006/0267989 A1 * | 11/2006 | Campbell | G06T 1/20 345/502 |
| 2009/0066726 A1 * | 3/2009 | Kato | B60R 1/00 345/639 |
| 2010/0026697 A1 * | 2/2010 | Xiang | H04N 19/61 345/564 |
| 2014/0028876 A1 * | 1/2014 | Mills | H04N 5/77 348/231.99 |
| 2014/0118376 A1 * | 5/2014 | Hakura | G06T 17/20 345/545 |
| 2014/0368536 A1 * | 12/2014 | Ao | G06T 1/60 345/629 |
| 2015/0325044 A1 | 11/2015 | Lebovitz | |
| 2015/0379666 A1 * | 12/2015 | Redzic | G06T 1/20 345/646 |

FOREIGN PATENT DOCUMENTS

WO  WO 2013/159330 A1  10/2013

OTHER PUBLICATIONS

Bilinear Interpolation, Jun. 17, 2016, Wikipedia.*
RAM: A Brief Introduction, Jul. 9, 2004.*

* cited by examiner

*Primary Examiner* — Kee M Tung
*Assistant Examiner* — Ming Wu
(74) *Attorney, Agent, or Firm* — Fenwick & West LLP (57) ABSTRACT

A device that includes integrated circuit includes a tiler circuit, a grid generator, and a warper circuit. The tiler circuit divides the distorted input image data into a plurality of image tiles and stores the image tiles into a memory device. Each image tile is an M×N array of pixel samples where M and N are greater than 1. The grid generator produces a mesh grid that describes a mapping of first pixel locations of the distorted image data to second pixel locations of the corrected image data. The warper circuit reads one or more of the image tiles from the memory device based on the mesh grid and interpolates a warped output image from the image tiles read from memory.

16 Claims, 10 Drawing Sheets

FIG. 9B ative device, according to one embodiment

IMAGE WARPING IN AN IMAGE PROCESSOR

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on a central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Raw image data may contain visual anomalies (e.g., due to rolling shutter effect) that can cause the resulting output image to appear distorted. For example, if a user causes a device to deviate from a fixed origin while capturing an image (e.g., pan, tilt, zoom, etc.), the resulting output image may contain unintended skew within certain portions of the image. To correct this distortion, a warper can transform pixels of an input image into an output image. However, the degree to which the warper can correct certain types of distortion, such as rotational distortion, may be limited.

SUMMARY

In one embodiment, a device is disclosed that receives input image data and generates corrected output image data. The device includes a memory and an integrated circuit. The integrated circuit includes a tiler circuit, a grid generator, and a warper circuit. The tiler circuit divides the input image data into a plurality of image tiles and stores the image tiles into memory. Each image tile is an M×N array of pixel samples where M and N are integers greater than 1. The grid generator produces a mesh grid that describes a mapping of first pixel locations of the input image data to second pixel locations of the corrected output image data. The warper circuit reads one or more of the image tiles from the memory device based on the mesh grid and generates a warped output image from the image tiles read from memory.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

In one embodiment, an output rescale module of an electronic device receives distorted input image data and generates corrected output image data. The output rescale module includes a tiler circuit that divides an image into a number of image tiles that can be stored in memory, a grid generator circuit that generates a mesh grid, and a warper circuit that reads the image tiles from memory as it maps the distorted input image data into corrected output image data using the mesh grid. By correcting distorted image data using tiled images, the warper circuit can perform a greater degree of vertical deflection in the output image.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
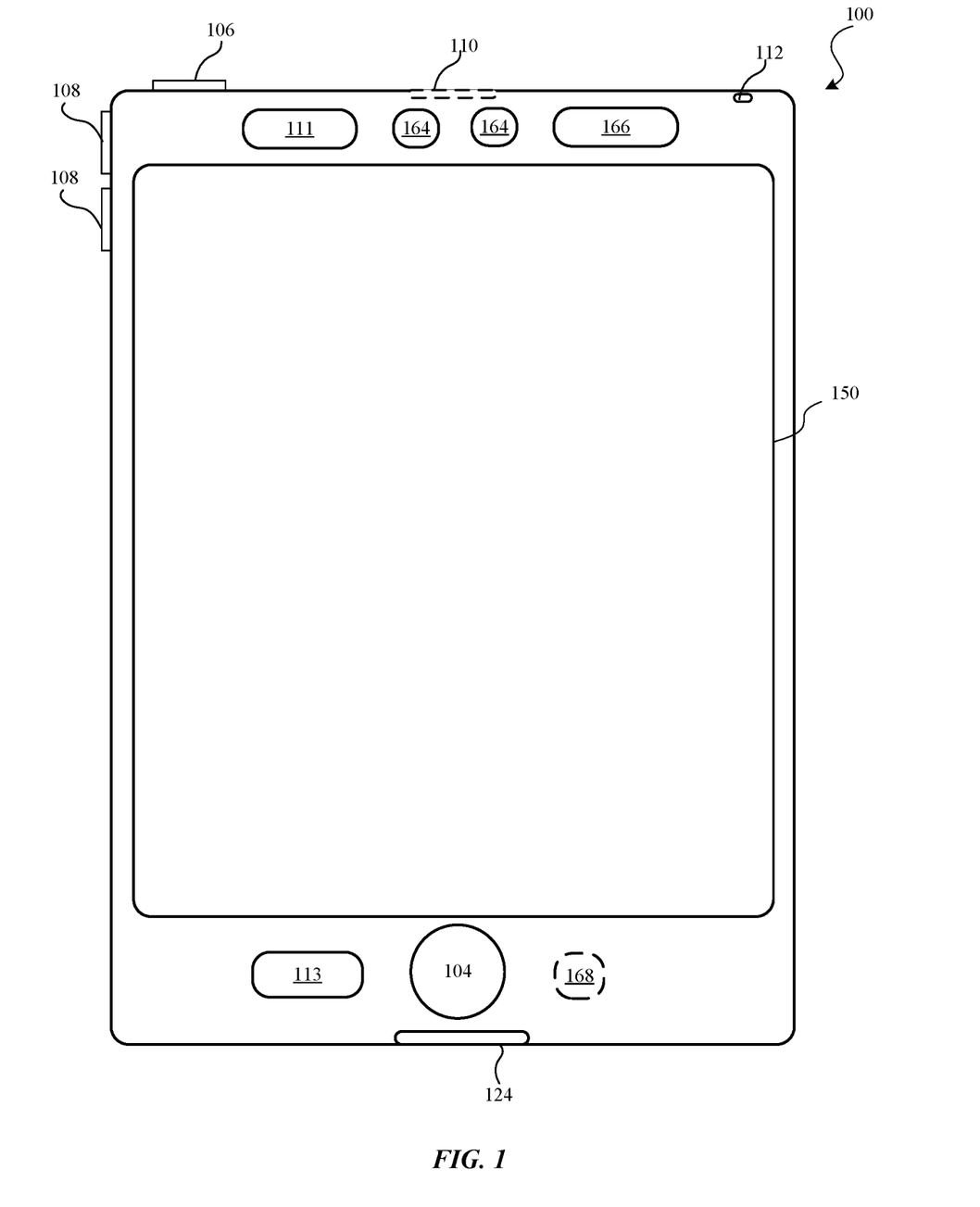
FIG. 1 is a high-level diagram of an electronic device, according to one embodiment

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
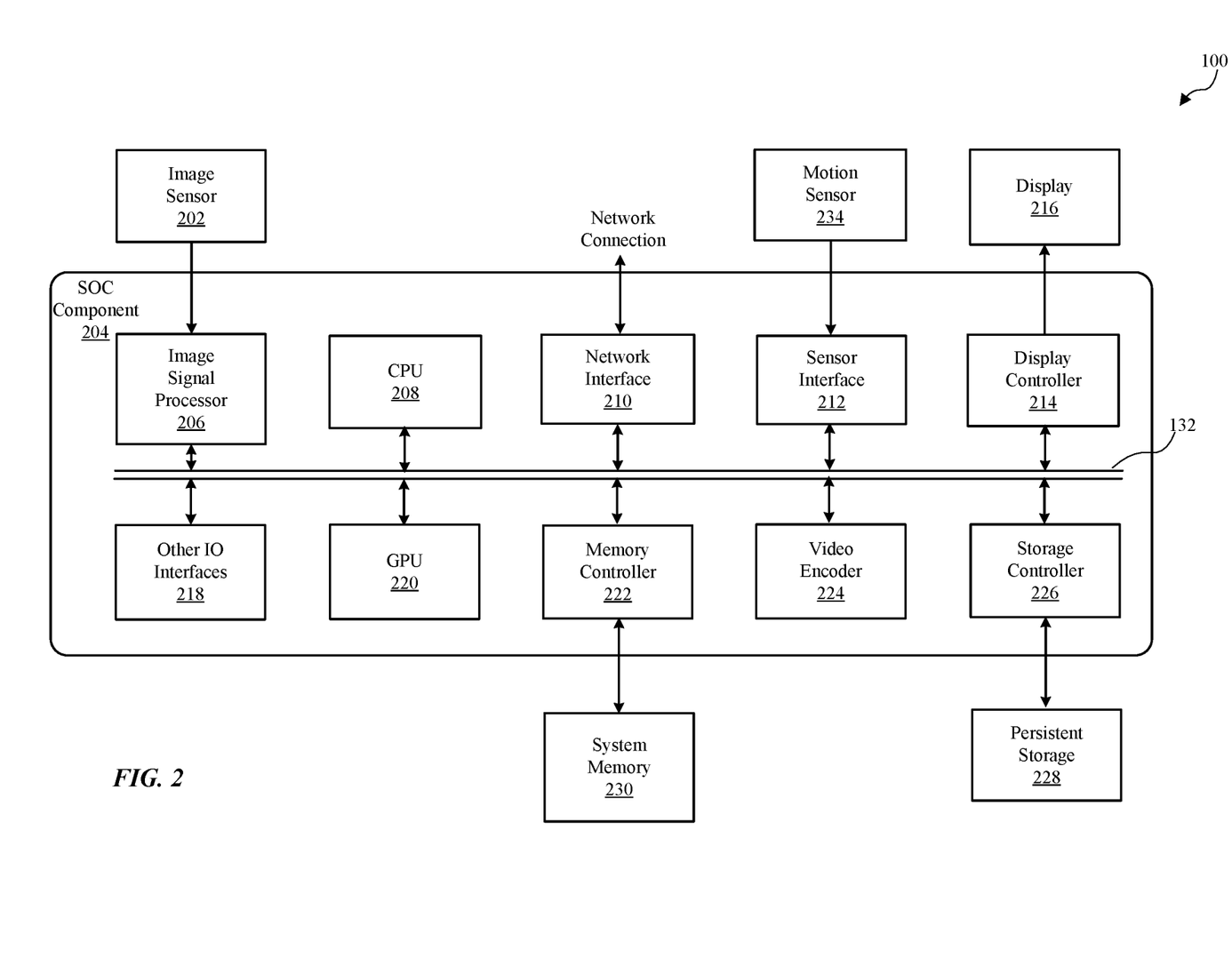
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), NAND or NOR flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor 220 or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
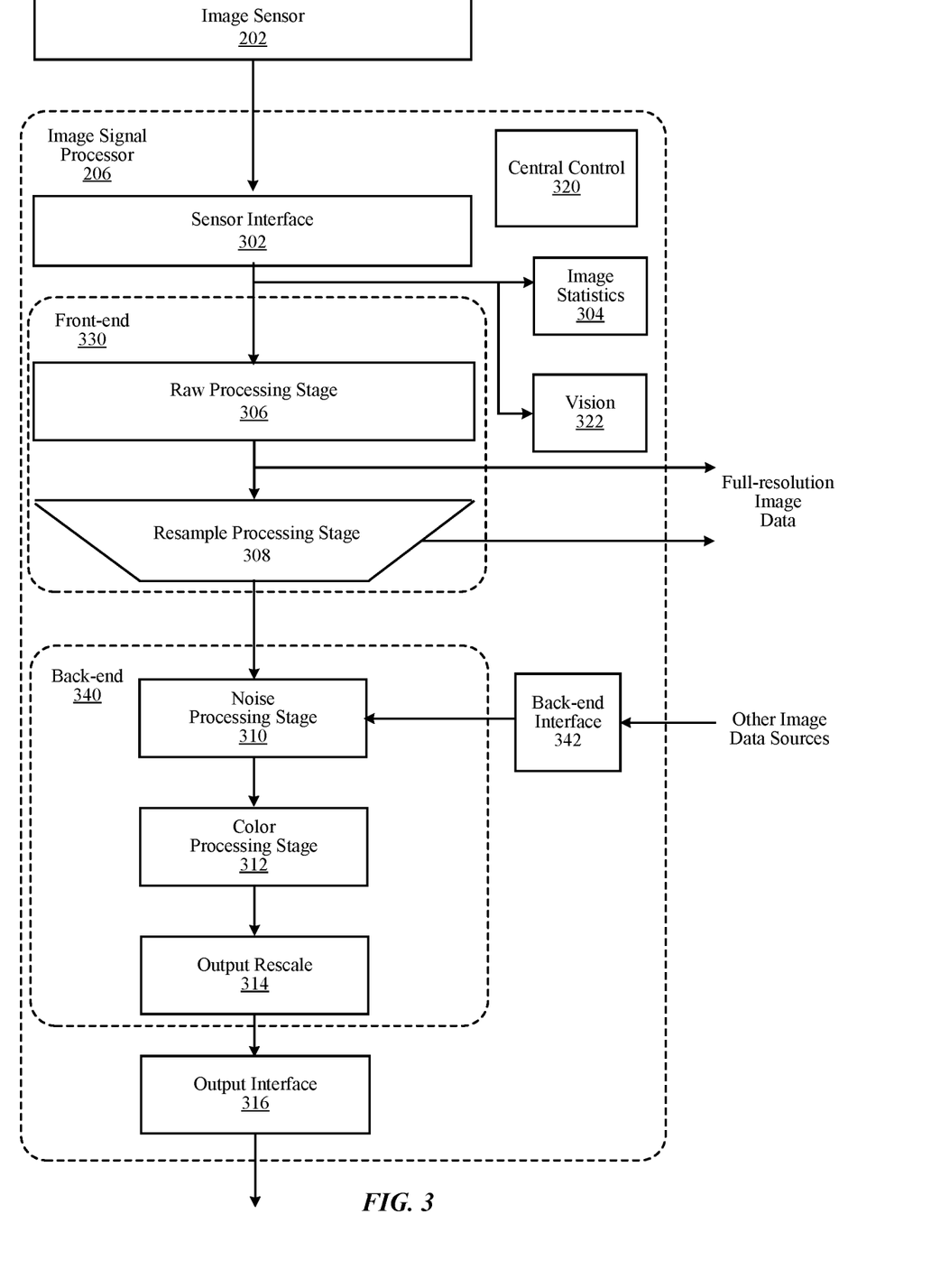
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle). Although embodiments described herein include embodiments in which the one or more back-end pipeline stages 340 process image data at a different rate than an initial data rate, in some embodiments back-end pipeline stages 340 may process image data at the initial data rate.

Sensor interface 302 receives raw image data from image sensor 202 and processes the raw image data into image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally on a line by line basis). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, convolution and generation of histogram-of-orientation gradients (HOG). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. Convolution may be used in image/video processing and machine vision. Convolution may be performed, for example, to generate edge maps of images or smoothen images. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion). In one embodiment, operations such as rotating and shearing, perspective warping, rolling shutter compensation, are examples of warping operations that may be performed by a warper circuit of the output rescale module 314, as will be described herein.

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. In one embodiment, the output rescale module 314 may generate images tiles from image data in the image data line buffers, and store the tiles into memory. The image tiles can then be retrieved to perform warping operations.

Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Output Rescale Module

Figure 4:
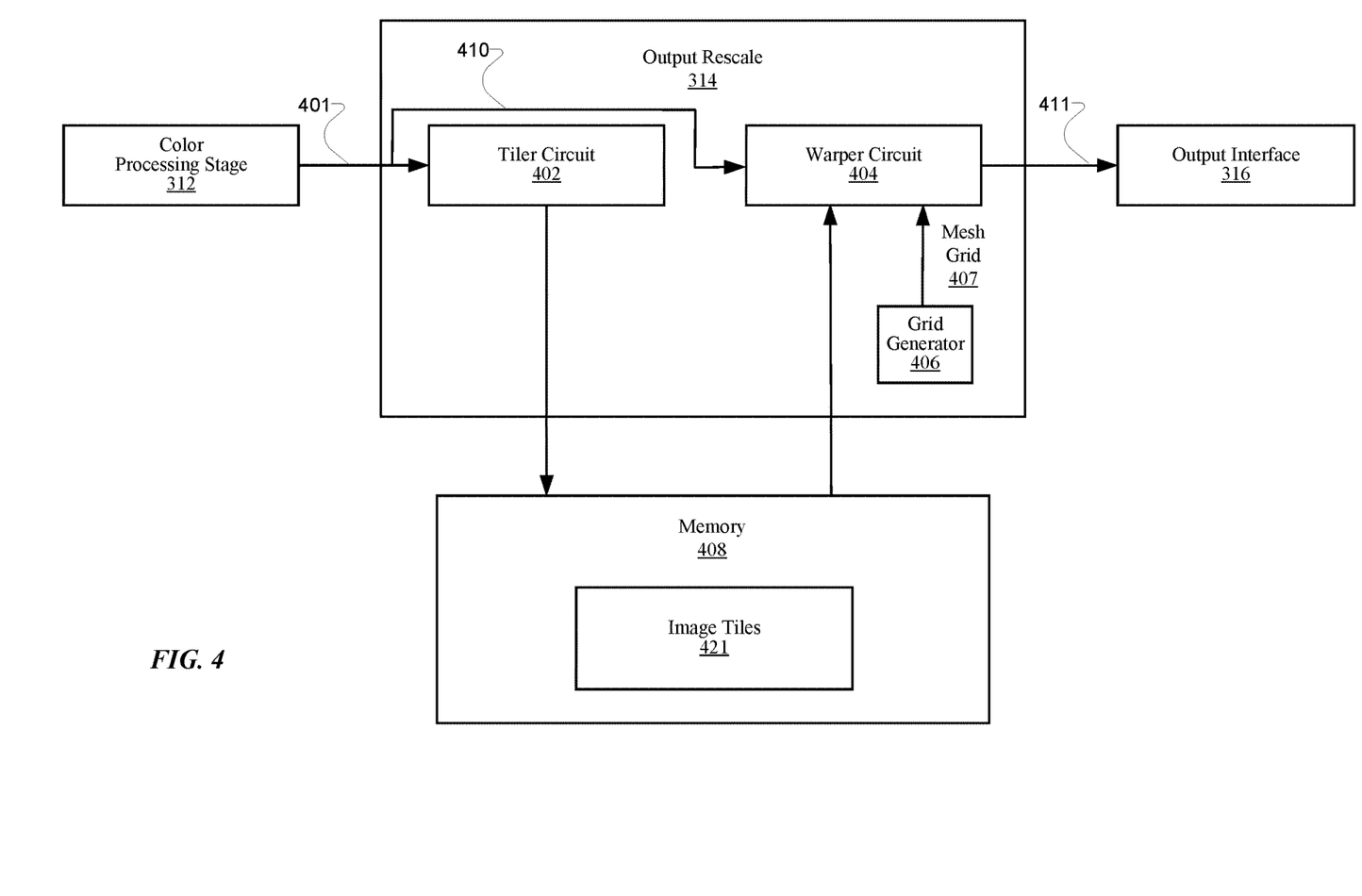
FIG. 4 is a block diagram illustrating an integrated circuit containing a tiler circuit and a warper circuit, according to one embodiment.

FIG. 4 is a block diagram illustrating the circuits of an output rescale module 314 and its surrounding circuits, according to one embodiment. The output rescale module 314 may perform a per-pixel perspective transformation between input image data and output image data in order to correct artifacts caused by sensor motion during the capture of the image frame (e.g., input image). In the embodiment shown in FIG. 4, the output rescale module 314 contains a tiler circuit 402, a warper circuit 404, and a grid generator 406.

The tiler circuit 402 receives image data for an input image 401 from the color processing stage 312 and generates a tiled version of the input image to store in memory 408. The input image 401 can be in a format such as YCbCr 4:2:2, and the embodiments described herein will assume that the image format is YCbCr 4:2:2. However, in other embodiments the image can be in YCbCr 4:4:4 or other appropriate image formats.

The input image 401 can have a high resolution and is divided by the tiler circuit 402 into many different image tiles 421. Each image tile is an M×N rectangular array of image samples from the input image with M pixel samples in the horizontal direction and N pixel samples in the vertical direction. M is an integer greater than 1 but smaller than the horizontal resolution of the input image 401. N is an integer greater than 1 but smaller than the vertical resolution of the input image. In one embodiment, the input image 421 is in the YCbCr 4:2:2 format and has a resolution of 4608×2592. The luma data of the input image 421 can be divided into 32×4 image tiles 421, thereby resulting in 93,312 image tiles for the luma data of the input image 421. Additionally, the chroma data of the input image can be divided into 32×4 image tiles 421, thereby resulting in 93,312 image tiles 421 for the chroma data.

In one embodiment, the memory 408 is dynamic random access memory (DRAM). The memory 408 can be located in an IC chip that is separate from the IC chip that the output rescale module 314 is located on. For example, the memory 408 can represent one or more dedicated DRAM memory chips. The memory 408 may be the same as system memory 230 shown in FIG. 2. In other embodiments, the output rescale circuit 314 and the memory 408 can be located within the same IC chip.

The memory 408 allows data to be written to and read from the memory 408 during a memory access transaction. Due to hardware constraints, the number of bytes transferred in a single memory access transaction is typically a fixed number of bytes. For example, if the interface to the memory 408 is 128 bits wide and the burst length of a memory access transaction is 8 bits, then the fixed size of the memory access transaction is 8×128=1024 bits=128 bytes.

The grid generator 406 generates a mesh grid 407. The mesh grid 407 represents a mapping of pixel coordinate locations from the input image 401 to pixel coordinate locations in the output image 411. The grid generator 406 can generate the mesh grid by reading the grid from a memory, or it can generate the mesh grid in other ways.

The warper circuit 404 retrieves the image tiles 421 from memory 408 in accordance with the mesh grid. The warper circuit 404 uses the image tiles 422 to perform a warping transformation of the input image 401 into the output image 411 (e.g., warped image) that is subsequently sent to the output interface 316. Using the image tiles 421 to perform warping allows the warper circuit 404 to correct for large amounts of image distortion without increasing the size of the buffer in the warper circuit 404, as will be explained herein. The warper circuit can also operate in a streaming mode, in which the warper circuit 404 receives the input image 401 line by line from the color processing stage 312 via the streaming path 410, bypassing the tiler circuit 402.

Figure 5:
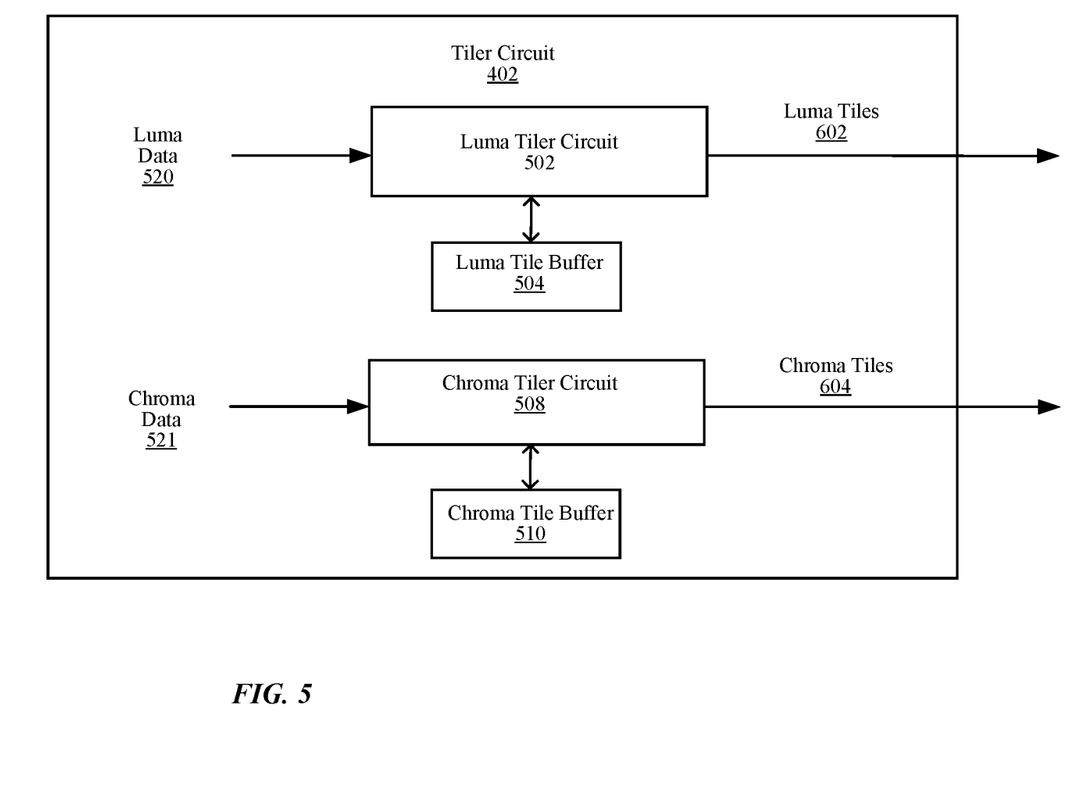
FIG. 5 is a block diagram illustrating a tiler circuit, according to one embodiment.

FIG. 5 is a block diagram illustrating a tiler circuit 402, according to one embodiment. In the embodiment shown in FIG. 5, the tiler circuit 402 includes a luma tiler circuit 502, a luma tile buffer 504, a chroma tiler circuit 508, and a chroma tile buffer 510. The tiler circuit 402 receives input image data for an input image 401 that includes luma data 520 and chroma data 521. The tiler circuit 402 reformats the luma data 520 into luma tiles 602 and reformats the chroma data 521 into chroma tiles 604. The luma tiles 602 and the chroma tiles 604 are examples of the image tiles 421 from FIG. 4. In one embodiment, image tiles 421 may be compressed and stored in memory 408 in a compressed format. In another embodiment, the image tiles 421 may be stored in an uncompressed format.

Figure 6:
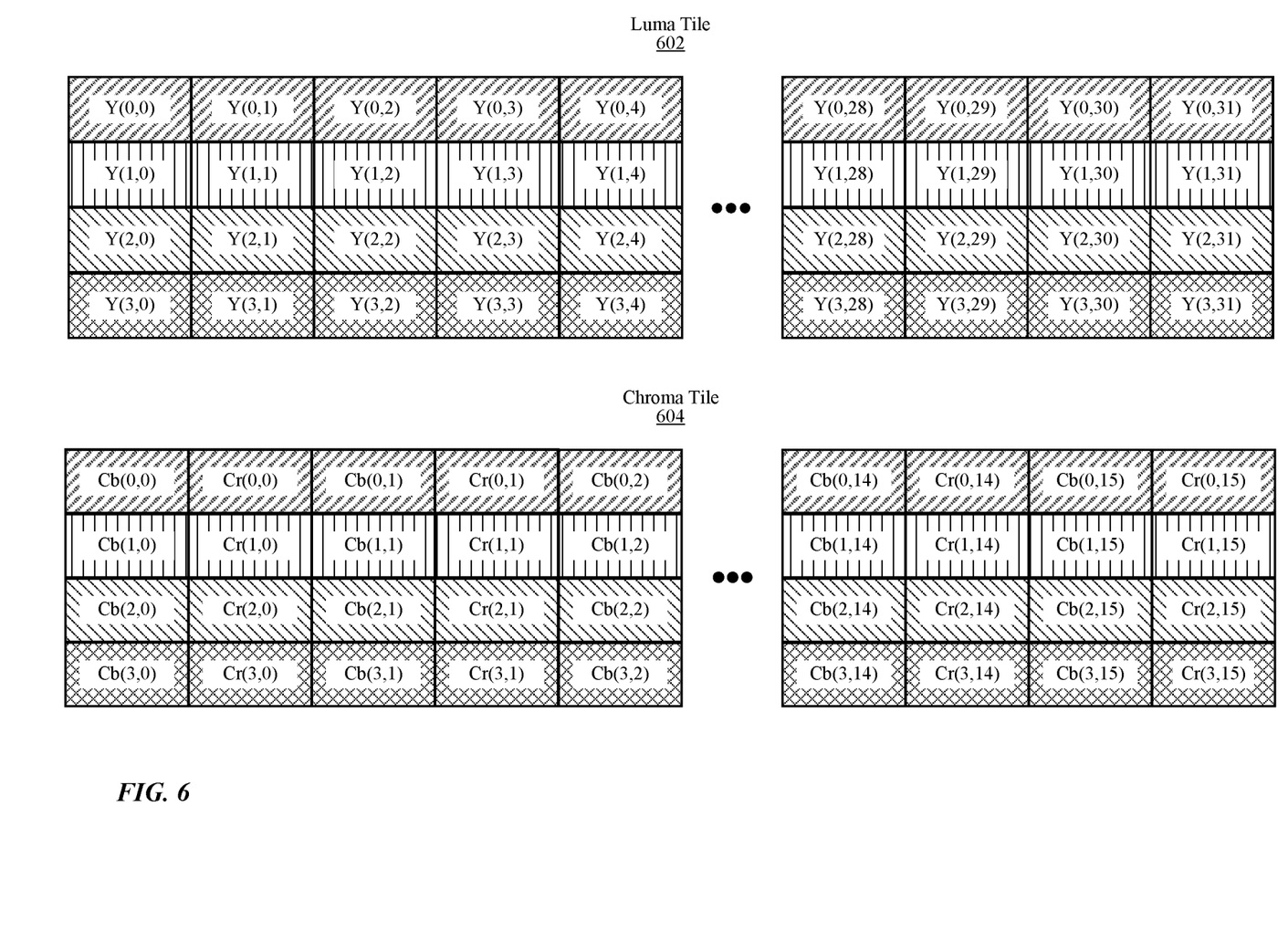
FIG. 6 is an illustration of a luma tile and a chroma tile, according to one embodiment.

The luma tiler circuit 502 receives full-resolution luma data as input and divides the luma data 520 into luma tiles 530 to be stored in memory. FIG. 6 illustrates a luma tile 602, according to one embodiment. As shown in FIG. 6, each luma tile contains 128 luma samples (e.g., Y(0,0) to Y(3,31)) that are arranged into a 32×4 memory tile configuration comprising 128 bytes of memory. A single luma tile 602 is stored into the memory 408 during a single memory access operation. Thus, the size of the luma tile 602 is equivalent to the amount of data that can be transferred during a single memory access operation to the memory 408. This allows the tiles to be written to and read from the memory 408 as efficiently as possible.

In order to assemble these tiles, the luma tiler circuit 502 uses a luma tile buffer 504 that is equivalent to four 4,608-pixel lines divided into 16 quarter-line segments. The replacement policy for the luma tile buffer 504 is discussed further in reference to FIG. 7 below.

The chroma tiler circuit 508 receives chroma data 521 (e.g., chroma data from a 4:2:2 input image) as input and reformats the chroma data 521 into chroma tiles 604 to be stored in memory 408. FIG. 6 illustrates a chroma tile 604, according to one embodiment. As shown in FIG. 6, each chroma tile 604 contains 64 Cb/Cr pairs (e.g., Cb(0,0)/Cr(0,0) to Cb(3,15)/Cr(3,15)) that are arranged into a 32×4 memory tile configuration comprising 128 bytes of memory. A single chroma tile 604 is stored into the memory 408 during a single memory access operation. Thus, the size of the chroma tile 604 is equivalent to the amount of data that can be transferred during a single memory access operation to the memory 408. To tile the image, the chroma tiler circuit 508 uses the chroma tile buffer 510 that is similar to the luma tile buffer 504 in size and replacement policy.

Figure 7:
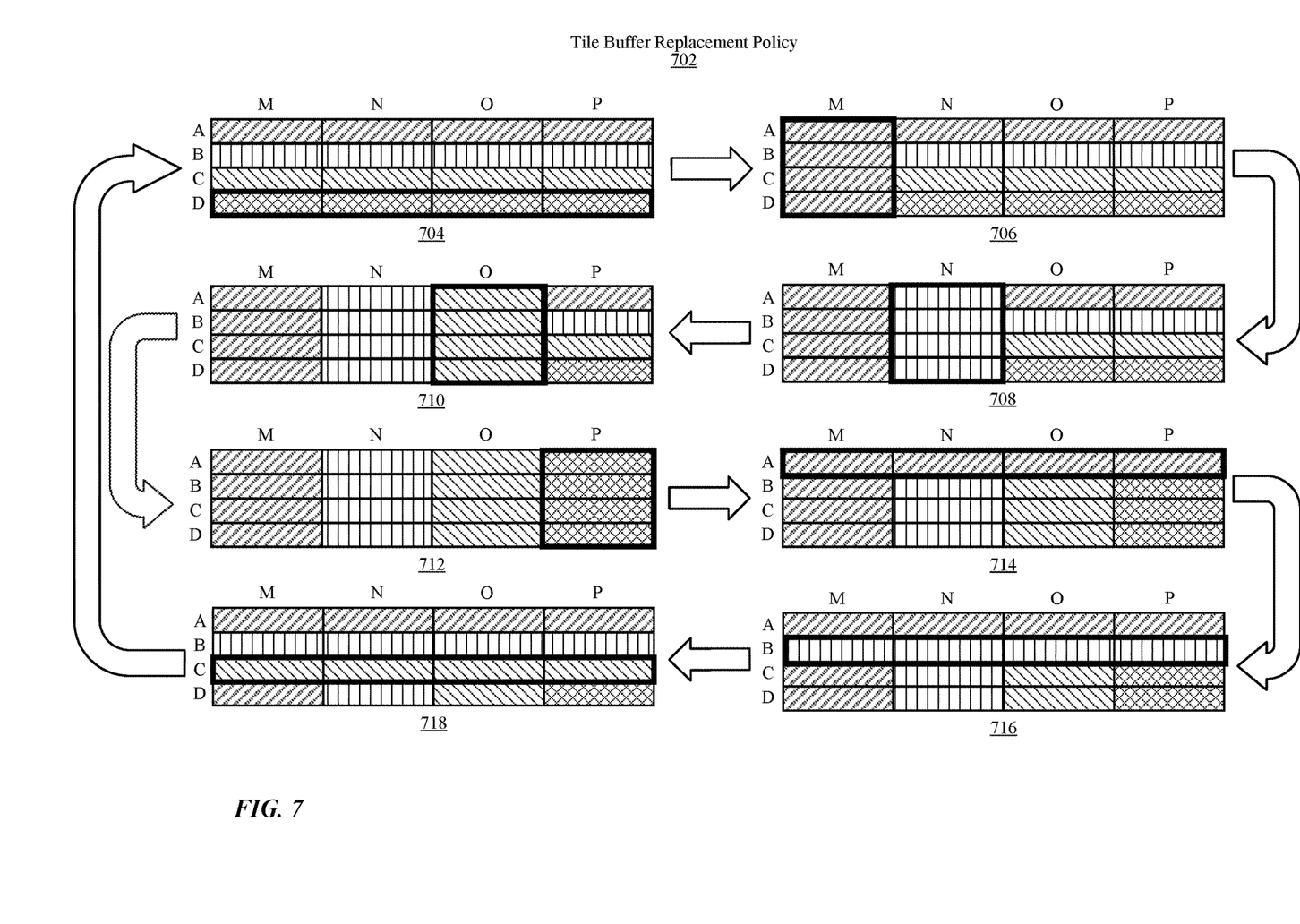
FIG. 7 is an illustration of a tiler cache allocation policy, according to one embodiment.

FIG. 7 illustrates a tile buffer replacement policy 702, according to one embodiment. It should be noted that this replacement policy applies to, both, the luma tile buffer 504 and chroma tile buffer 510. Therefore, discussion of the tile buffer replacement policy 702 will be conducted generically for the purposes of this illustration.

The size of the tile buffer 504 is substantially smaller than the size of the input image. In one embodiment, substantially smaller means that the tile buffer 504 can only store less than 10% of the input image 401. Because of the small size of the tile buffer 504, the entire input image 401 may not fit into the tile buffer 504. The tile buffer replacement policy 702 provides a technique for efficiently using the small tile buffer 504 while still allowing tiling operations to occur.

As shown in FIG. 7, the tile buffer 504 is equivalent to four 4,608-pixel lines in size, and is divided into 16 segments across lines A through D. For lines A, B, and C, the tile buffer 504 is written to in a linear format, beginning with segment A-M to A-P, and ending with segments C-M to C-P. When segments D-M to D-P are written to, as illustrated in step 704, the tile buffer is full because it now stores four lines of the input image 401 for a subset of the input image 401. Once full, column M is evicted from the tile buffer 504 and is written to memory one tile at a time. Because the tile buffer is 4,608 samples wide and 4 samples tall, each column in the luma tile buffer 504 contains 36 luma tiles. Similarly, each column in the chroma tile buffer 510 contains 36 chroma tiles composed of 72 Cb/Cr pairs.

When column M is written to memory, the tile buffer 504 repopulates column M with the next line of luma data 520 from the input image, as shown in step 706. Column N is also written to memory one tile at a time. The tile buffer then repopulates column N as shown in step 708. Additionally, columns O and P are evicted and repopulated with new lines of image data as shown in steps 710 and 712, respectively.

When column P is written to, the tile buffer is full because it now stores four new lines of the input image 401 for a subset of the input image 401. Row A is then evicted/repopulated as shown in step 714. Similarly, rows B and C are written to memory 408 and repopulated as illustrated in step 716 and 718, respectively. This pattern repeats with the eviction/repopulation of row D in step 704, and continues alternating between horizontal and vertical output (e.g., evicting rows and writing new lines of image data to the rows, then evicting columns and writing new lines of image data to the columns) until the input image has been completely tiled and stored in memory.

Figure 8:
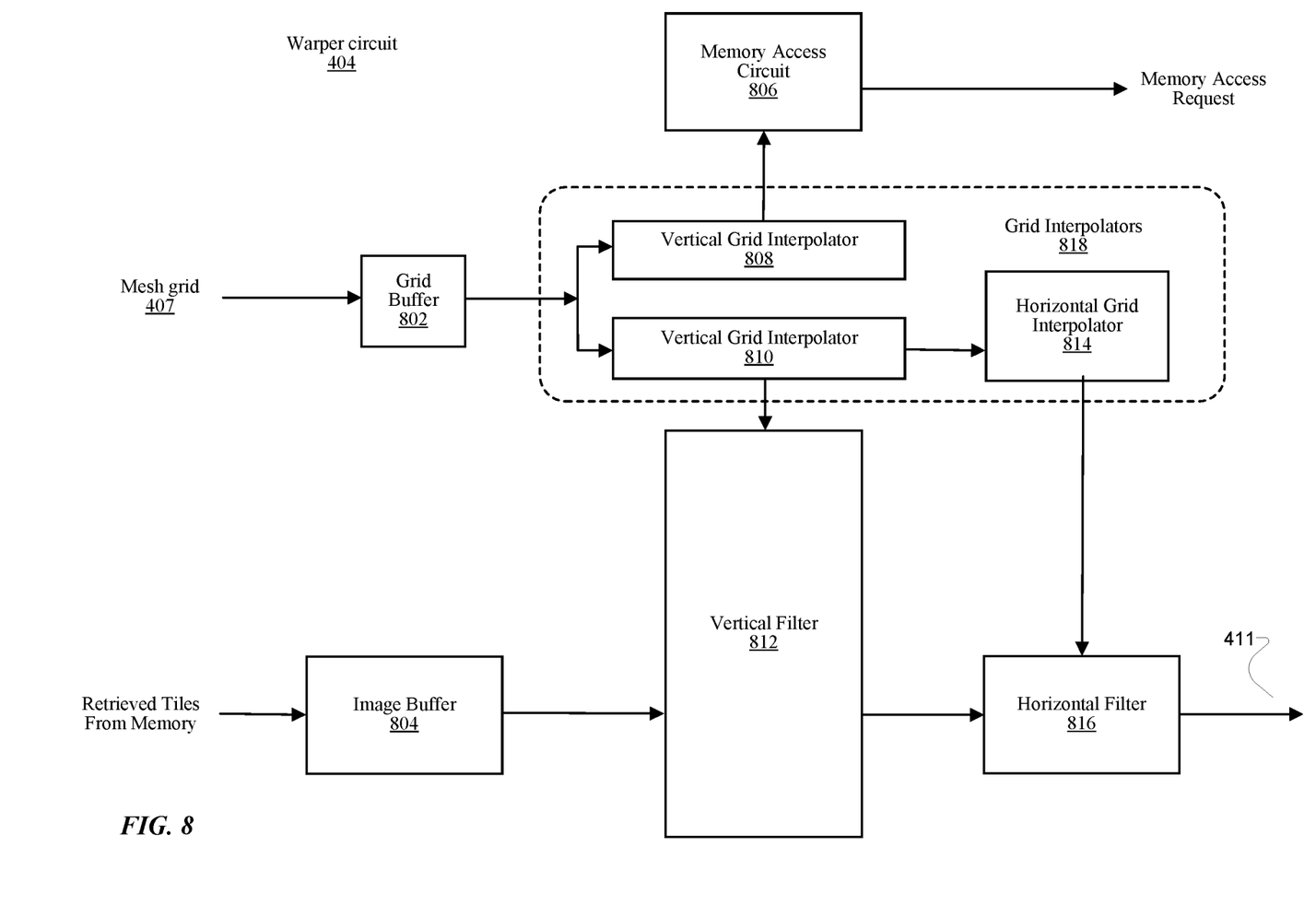
FIG. 8 is a block diagram of a warper circuit, according to one embodiment.

FIG. 8 is a block diagram illustrating a warper circuit 404, according to one embodiment. The warper circuit 404 reads image tiles 421 from memory 408 based on a mesh grid generated by the grid generator 406, and performs a warping transformation on the image tiles 421 to produce an output image 411. The warper circuit 404 has two modes of operation. A streaming mode is used when the warper circuit 404 is receiving pixels directly from the color processing stage 312 or another streaming source (e.g., bypassing the tiler circuit 402). The warper circuit 404 operates in tiled mode when the image source consists of image tiles 421 written to memory 408 by the tiler circuit 402. In the tiled mode, the warper circuit 404 can read image tiles 421 directly from memory 408 in a non-raster order (i.e., read from memory in any order, not necessarily line by line) to facilitate more warping. In the embodiment illustrated in FIG. 8, the warper circuit includes a grid buffer 802, an image buffer 804, a memory access circuit 806, grid interpolators 818, a vertical filter 812, and a horizontal filter 816. The grid interpolators 818 include two vertical grid interpolators 808 and 810, and a horizontal grid interpolator 814.

The grid buffer 802 stores pixel coordinate mappings of the mesh grid 407 and provides the pixel coordinate location mappings to the two vertical grid interpolators 808 and 810 throughout the warping process. The mesh grid can be a coarse grid that does not include pixel coordinate location mappings for each coordinate of the output image 411, but instead only includes pixel coordinate location mappings for one in every 1,024 pixels of the output image 411 (e.g. each pixel coordinate location mapping is separated from the next pixel coordinate location mapping by 32 pixels in the horizontal direction and by 32 pixels in the vertical direction). In one embodiment, the grid buffer 802 can store four lines of the mesh grid, where each line is a maximum of 145 grid points in width. Other embodiments may include coarser or finer mesh grids, non-square mesh grids, irregular mesh grids (e.g., different mesh grid sizes for different portions of the output image 411), or a per-pixel mesh grid.

The grid interpolators 818 perform interpolation of input coordinates of an input grid mesh produced by the grid generator 406. The grid interpolators 818 trace the grid mesh in raster order (i.e., horizontally on a line by line basis) and compute a fractional input Y coordinate for each integral X coordinate, and fetch a new pair of grid coordinates from the grid buffer 802 for every 32 pixels of output. The grid interpolators 818 include a vertical grid interpolator 808, a second vertical grid interpolator 810, and a horizontal grid interpolator 814. Vertical grid interpolator 808 is used to drive the memory access circuit 806, which formats memory access requests to fetch additional image tiles from memory 408 for storage in the image buffer 804. Vertical grid interpolator 810 is used to drive the vertical filter 812. Both vertical grid interpolators 808 and 810 produce the same interpolation results but do so at different times. Vertical grid interpolator 808 basically pre-generates pixel coordinate locations of the input image 916 so that image tiles 421 at those coordinates can be pre-fetched into the image buffer 804. At a later point in time, the vertical grid interpolator 810 generates the same coordinates of the input image 916 and requests processing on the image tiles 421 at those coordinates, which are already pre-fetched into image buffer 804.

The horizontal grid interpolator 814 computes horizontal interpolations of input coordinates to be passed to the horizontal filter 816 using the grid coordinates generated by the vertical grid interpolator 810. This interpolation process will be discussed in greater detail in FIGS. 9A and 9B.

The warper circuit 404 includes an image buffer 804 that is used for facilitating the warping process in both streaming and tiled modes. The size of the image buffer 804 is smaller than the size of the input image. In one embodiment, substantially smaller means that the buffer 804 can only store less than 10% of the input image 401. The image buffer 804 can include 12 line buffers, where each line buffer is 4,608 samples in width, used to temporarily store image tiles read from memory. In tiled mode, each image tile 421 is written to exactly one location in the image buffer 804. Because each image tile 421 retrieved from memory 408 is 32×4 samples, the image buffer 804 can accommodate 144 columns and 3 rows of tiles in tiled mode. Within each respective tile column, the 3 rows of tiles act as a sliding-window within that column.

In streaming mode, twelve line buffers within an image buffer 804 provide a unified sliding-window that spans the 4,608 pixel width of the image buffer 804. Each pixel of the original input image is mapped directly to an input line of the buffer. In both modes, the line buffers within an image buffer 804 can be folded up to a factor of 4, trading off the width of a sliding-window for vertical support during the warping process.

The vertical filter 812 filters each column of the sliding-window with a 9-tap vertical polyphase filter. The vertical filter 812 reads image tiles from the image buffer 804 to produce a stream of vertically-filtered pixels that it passes directly to the horizontal filter 816 for 9-tap horizontal polyphase filtration. If a requested image tile is unavailable in the image buffer 804, the vertical filter 812 will stall until the image tile is available.

Figure 9A:
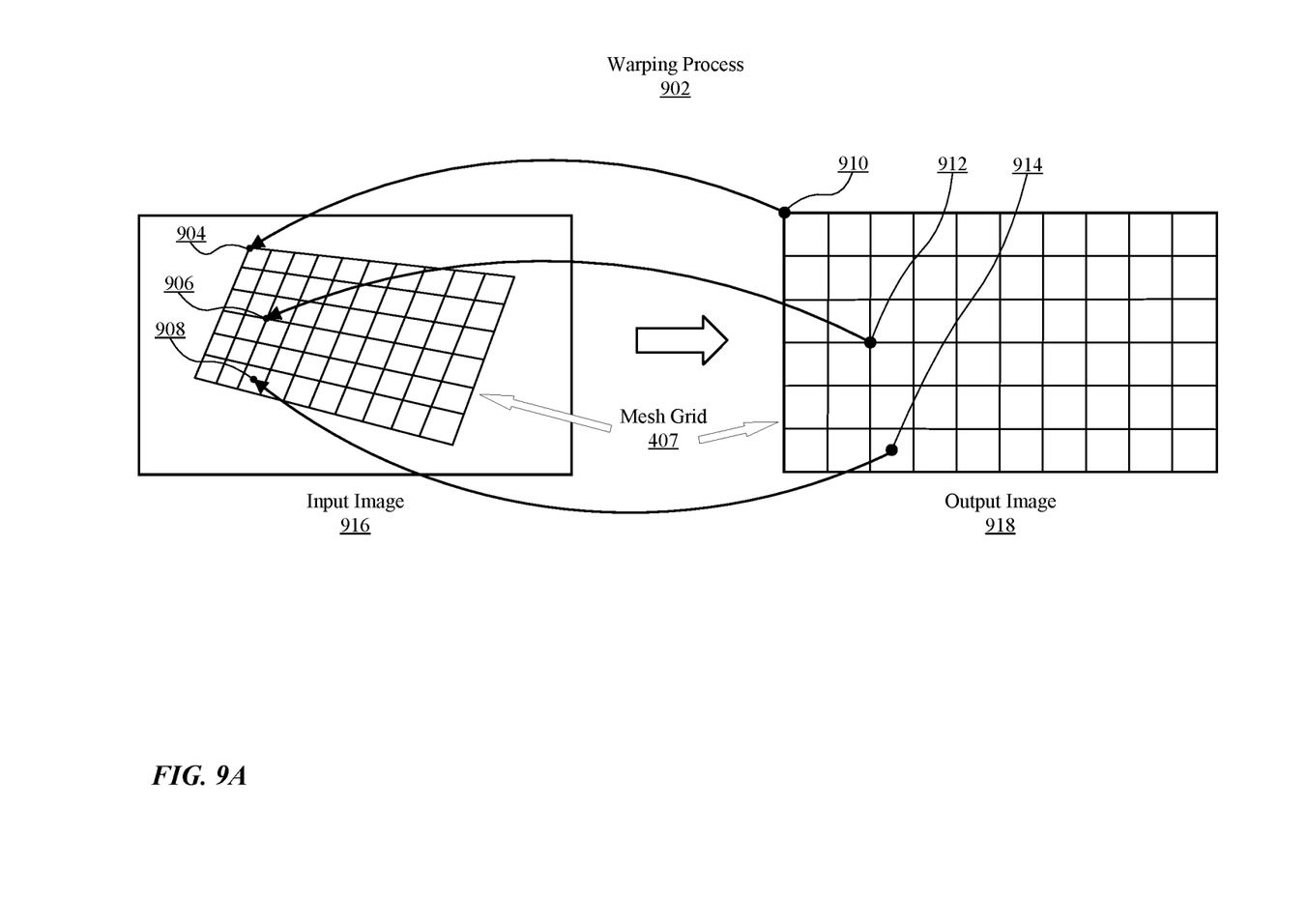
FIG. 9A is an illustration of a warping process, according to one embodiment.

FIG. 9A illustrate a warping process, according to one embodiment. In the embodiment illustrated in FIG. 9A, the warper circuit 404 performs a piecewise image warp from an input image 916 (e.g, image containing unintended distortion) to an output image 918 (e.g., corrected image). The mesh grid 407 controls the nature of the underlying warping transformation. Most sample locations of the output image 918 map to a bilinearly interpolated (e.g., vertical and horizontal interpolation) input coordinate of the input image 916. The grid interpolators 818 step through the mesh grid 407 in raster order, generating the input coordinates associated with each output coordinate by interpolating the input coordinates stored in the grid buffer 802. For example, output coordinates 910, 912, and 914 map to input coordinates 904, 906, and 908, respectively. The grid interpolators 818 step through each line of the mesh grid 407 vertically, and for each line the range of input X coordinates associated with the line is computed from the mesh grid. This range of X coordinates is rounded to integral input pixel coordinates. The grid interpolators 818 then step through the input image 916 horizontally, and at each point the corresponding fractional input Y value is computed from the mesh grid 407 coordinates for use by the vertical filter 812. In addition to computing the Y value, the grid interpolators 818 also compute a fraction X input coordinate while stepping horizontally through the input image 916. This X input coordinate is used by the horizontal filter 816 to select a filtering position.

Figure 9B:
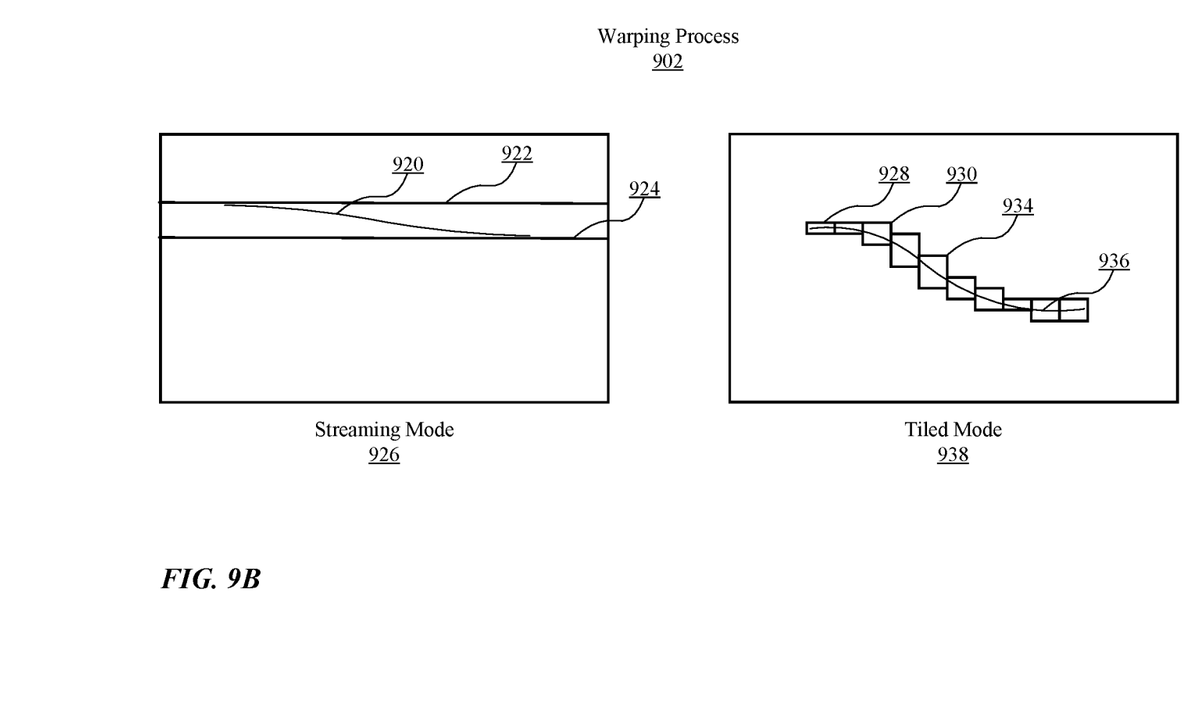
FIG. 9B is an illustration of a warping process for streaming mode and tiled mode, according to one embodiment.

FIG. 9B illustrates a warping process in both streaming mode 926 and tiled mode 938, according to one embodiment. Both modes use 12 line buffers within an image buffer 804 (with a maximum input width of 4,608 pixels) to cache a region of the input image. In the streaming mode 926, the image buffer 804 presents a sliding-window consisting of 11 lines (one line is needed for input buffering in streaming mode 926) spanning the entire width of the input image. This sliding-window is illustrated in FIG. 9B between lines 920 and 924. Because there are only 11 lines available in the sliding-window rather than 12, the amount of vertical deflection that the warper circuit 404 is able to perform is limited. Thus, the warper circuit 404 is only able to correct for slight distortions (e.g., 920). In tiled mode 938, the image buffer 804 can accommodate 144 columns and 3 rows of 32×4 image tiles. Within each respective tile column, the 3 rows of tiles act as a sliding-window within that column. These columns are shown in FIG. 9B as the distorted image 936 is partitioned into columns 928, 930, and 934, containing 1 tile, 2 tiles, and 3 tiles, respectively.

It should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the embodiments, which is set forth in the following claims.

What is claimed is:

1. A circuit, comprising:
  a tiling circuit configured to divide an input image into a plurality of image tiles, and to store the image tiles into memory;
  a grid generator configured to generate a mesh grid that represents a mapping of first pixel locations of the input image to second pixel locations of an output image; and
  a warper circuit configured to read two or more of the image tiles from the memory as defined by the mesh grid and to warp the input image into the output image from the two or more image tiles read from the memory, the warper circuit comprising:
    a first grid interpolator configured to generate interpolated pixel locations along a direction from the mesh grid at a first time for a memory access circuit to pre-fetch at least the two or more of the image tiles at the first interpolated pixel locations from the memory and store the pre-fetched two or more image tiles in an image buffer, the interpolated pixel locations differing based on the mesh grid; and
    a second grid interpolator separate from the first grid interpolator, the second grid interpolator configured to generate the same interpolated pixel locations along the direction from the mesh grid at a second time subsequent to the first time for passing the pre-fetched two or more images in the image buffer through a filter to generate filtered pixels of the output image.

2. The circuit of claim 1, wherein each of the image tiles has a size that corresponds to a fixed amount of data that is transferred to or from the memory in a single memory access operation.

3. The circuit of claim 1, wherein the image tiles include luma image tiles and chroma image tiles, and the tiling circuit includes:
  a luma tiler circuit configured to divide luma data of the input image into the plurality of luma image tiles; and
  a chroma tiler circuit configured to divide chroma data of the input image into the plurality of chroma image tiles.

4. The circuit of claim 1, wherein the tiling circuit is configured to temporarily store lines of the input image into a tile buffer and to divide the lines from the tile buffer into the image tiles.

5. The circuit of claim 4, wherein the tile buffer includes a plurality of line buffers each having a plurality of segments, the segments of the line buffers organized in a plurality of rows and a plurality of columns, and the segments are configured to be populated and evicted in an alternating column and row format.

6. The circuit of claim 5, wherein the tiling circuit further is configured to:
  populate the tile buffer on a row by row basis with a first subset of lines of the input image until the buffer is filled with the first subset of lines of the input image; and
  evict the first subset of lines from the tile buffer on a column by column basis while re-populating the tile buffer on a column by column basis with a second subset of lines of the input image until the tile buffer is filled with the second subset of lines of the input image.

7. The circuit of claim 1, wherein the warper circuit is further configured to store the two or more image tiles read from the memory in non-raster order.

8. The circuit of claim 1, wherein, in a streaming mode of the circuit, the warper circuit is further configured to receive the input image that bypassed the tiling circuit.

9. A method, comprising: dividing an input image into a plurality of image tiles by a tiling circuit of the image processing circuit;

storing the image tiles into memory by the tiling circuit;

generating a mesh grid that represents a mapping of first pixel locations of the input image to second pixel locations of an output image;

generating, by a first grid interpolator of a warper circuit, interpolated pixel locations along a direction from the mesh grid at a first time for a memory access circuit to pre-fetch at least two or more of the image tiles at the interpolated pixel locations from the memory responsive to generating the interpolated pixel locations at the first time, the interpolated pixel locations differing based on the mesh grid;

storing the pre-fetched two or more image tiles in an image buffer of the warper circuit; generating, by a second grid interpolator of the warper circuit separate from the first grid interpolator, the same interpolated pixel locations along the direction from the mesh grid at a second time subsequent to the first time; and passing the pre-fetched two or more images in the image buffer through a filter to generate filtered pixels of the output image.

10. The method of claim 9, wherein each of the image tiles has a size that corresponds to a fixed amount of data that is transferred to or from the memory in a single memory access operation.

11. The method of claim 9, wherein the image tiles include luma image tiles and chroma image tiles, and dividing the input image into the plurality of image tiles comprises:

dividing luma data of the input image into the plurality of luma image tiles; and dividing chroma data of the input image into the plurality of chroma image tiles.

12. The method of claim 9, further comprising:

temporarily storing lines of the input image into the tiling circuit, and dividing the lines from the tiling circuit into the plurality of image tiles.

13. The method of claim 12, wherein the tiling circuit includes a plurality of line buffers each having a plurality of segments, the segments of the line buffers organized in a plurality of rows and a plurality of columns, and the segments are populated and evicted in an alternating column and row format.

14. The method of claim 13, wherein the plurality of line buffers are populated and evicted by:

populating a tile buffer in the tiling circuit on a row by row basis with a first subset of lines of the input image until the buffer is filled with the first subset of lines of the input image;

evicting the first subset of lines from the tile buffer on a column by column basis while re-populating the tile buffer on a column by column basis with a second subset of lines of the input image until the tile buffer is filled with the second subset of lines of the input image.

15. The method of claim 9, further comprising receiving, by the warper circuit in a streaming mode of the image processing circuit, the input image that bypassed the tiling circuit.

16. A device, comprising:

a memory; and an integrated circuit comprising:

a tiling circuit configured to divide an input image into a plurality of image tiles, and to store the image tiles into memory;

a grid generator configured to generate a mesh grid that represents a mapping of first pixel locations of the input image to second pixel locations of an output image; and a warper circuit configured to read two or more of the image tiles from the memory as defined by the mesh grid and to warp the input image into the output image from the two or more image tiles read from the memory, the warper circuit comprising:

a first grid interpolator configured to generate interpolated pixel locations along a direction from the mesh grid at a first time for a memory access circuit to pre-fetch at least the two or more of the image tiles at the first interpolated pixel locations from the memory and store the pre-fetched two or more image tiles in an image buffer, the interpolated pixel locations differing based on the mesh grid; and a second grid interpolator separate from the first grid interpolator, the second grid interpolator configured to generate the same interpolated pixel locations along the direction from the mesh grid at a second time subsequent to the first time for passing the pre-fetched two or more images in the image buffer through a filter to generate filtered pixels of the output image.

* * * * *